(12) United States Patent
Arunkumar et al.

(10) Patent No.: US 11,405,696 B2
(45) Date of Patent: Aug. 2, 2022

(54) SYSTEM AND METHOD FOR TARGETING MASS MEDIA ADS ON THE TELEVISION TO GIVEN PHYSICAL LOCATIONS USING ONLINE ACTIVITY PROFILES AT THE LOCATIONS

(71) Applicant: International Business Machines Corporation, Armonk, NY (US)

(72) Inventors: Saritha Arunkumar, Basingstoke (GB); Kuntal Dey, New Delhi (IN); Nizar Lethif, Croton on Hudson, NY (US); Enara C. Vijil, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/238,835

(22) Filed: Aug. 17, 2016

(65) Prior Publication Data
US 2018/0054657 A1    Feb. 22, 2018

(51) Int. Cl.
*H04N 21/63* (2011.01)
*H04N 21/80* (2011.01)
(Continued)

(52) U.S. Cl.
CPC ....... *H04N 21/812* (2013.01); *H04N 21/2668* (2013.01); *H04N 21/4532* (2013.01);
(Continued)

(58) Field of Classification Search
CPC .................................................. H04N 21/3556
(Continued)

(56) References Cited

U.S. PATENT DOCUMENTS 5,155,591 A    10/1992  Wachob
7,921,071 B2 *  4/2011  Hicks ....................... G06N 5/02
                                                  706/52
(Continued)

FOREIGN PATENT DOCUMENTS

WO    2013020100    2/2013

OTHER PUBLICATIONS

Meyer, D., "Worried about smart TVs listening in? Welcome to the smart home", Feb. 9, 2015, https://gigaom.com/2015/02/09/worried-about-smart-tvs-listening-in-welcome-to-the-smart-home/, pp. 1-5.
(Continued)

*Primary Examiner* — Mushfikh I Alam
(74) *Attorney, Agent, or Firm* — Fleit Intellectual Property Law; Donna Flores

(57)    ABSTRACT

Various embodiments select advertisements for delivery to at least one mass media streaming device at a given location and time slot. Content and corresponding time and physical location information being posted in an online portal from at least one electronic device are obtained. The content is filtered based on time slot and physical location. A set of typical topics for a location and time slot are determined. A subset of advertisements is selected from a set of available advertisements based on the set of typical topics. The subset of advertisements is delivered to the at least one mass media streaming device. The mass media streaming device may be a television. A set of current topics for the location and time slot may be determined and aggregated with the set of typical topics. The subset of advertisements may be selected from the set of available advertisements based on the aggregated set.

16 Claims, 3 Drawing Sheets

(51) Int. Cl.
  *H04N 21/81* (2011.01)
  *H04N 21/45* (2011.01)
  *H04N 21/2668* (2011.01)
  *H04N 21/845* (2011.01)
  *H04N 21/8405* (2011.01)

(52) U.S. Cl.
  CPC ..... *H04N 21/4524* (2013.01); *H04N 21/8405* (2013.01); *H04N 21/8456* (2013.01)

(58) Field of Classification Search
  USPC .................................................. 725/74–104
  See application file for complete search history.

(56) References Cited

U.S. PATENT DOCUMENTS

| | | | |
|---|---|---|---|
| 8,060,399 B2 | 11/2011 | Ullah | |
| 8,082,355 B1* | 12/2011 | Weber | G06Q 30/02 709/201 |
| 8,239,887 B2 | 8/2012 | Gilboa et al. | |
| 8,271,330 B2* | 9/2012 | Brignull | G06Q 30/02 705/14.52 |
| 8,726,312 B1 | 5/2014 | Hewinson | |
| 8,793,314 B2* | 7/2014 | Spivak | G06Q 10/063112 709/204 |
| 9,508,082 B1* | 11/2016 | Mannix | G06Q 30/0201 |
| 10,083,232 B1* | 9/2018 | Durham | H04N 21/4756 |
| 2002/0129362 A1 | 9/2002 | Chang et al. | |
| 2007/0250901 A1* | 10/2007 | McIntire | H04N 7/17318 725/146 |
| 2009/0128631 A1* | 5/2009 | Ortiz | H04N 21/6131 348/739 |
| 2010/0257552 A1 | 10/2010 | Sharan et al. | |
| 2011/0258050 A1 | 10/2011 | Chan et al. | |
| 2012/0096491 A1 | 4/2012 | Shkedi | |
| 2012/0150631 A1 | 6/2012 | Root et al. | |
| 2012/0214442 A1* | 8/2012 | Crawford | H04W 12/06 455/411 |
| 2013/0073473 A1* | 3/2013 | Heath | G06Q 30/0241 705/319 |
| 2013/0340089 A1* | 12/2013 | Steinberg | H04L 63/10 726/27 |
| 2014/0052790 A1* | 2/2014 | Yuen | A61B 5/4812 709/204 |
| 2014/0150016 A1* | 5/2014 | Feng | H04N 21/4788 725/34 |
| 2014/0156417 A1* | 6/2014 | Biswas | G06Q 30/0269 705/14.66 |
| 2014/0365484 A1* | 12/2014 | Freeman | H04W 4/21 707/736 |
| 2015/0026708 A1* | 1/2015 | Ahmed | H04N 5/23206 725/12 |
| 2015/0026721 A1 | 1/2015 | Feng et al. | |
| 2015/0074131 A1* | 3/2015 | Fernandez | G06F 17/30029 707/758 |
| 2015/0112963 A1* | 4/2015 | Mojtahedi | G06F 16/9537 707/711 |
| 2015/0170209 A1* | 6/2015 | Smith | G06Q 30/0267 705/14.64 |
| 2015/0220980 A1 | 8/2015 | Morrison | |
| 2015/0288997 A1* | 10/2015 | Basra | H04N 21/24 725/9 |
| 2015/0350376 A1* | 12/2015 | Vijay | H04L 67/325 709/204 |
| 2016/0048937 A1* | 2/2016 | Mathura | G06Q 40/12 705/30 |
| 2016/0066041 A1* | 3/2016 | Fei | H04N 21/252 725/34 |
| 2016/0066042 A1* | 3/2016 | Dimov | H04N 21/4667 725/34 |
| 2016/0179808 A1* | 6/2016 | De Napoli Ferreira | G06F 17/3089 707/725 |
| 2016/0232241 A1* | 8/2016 | Stoyanov | G06F 17/30867 |
| 2016/0275401 A1* | 9/2016 | Cao | H04L 51/32 |
| 2016/0285985 A1* | 9/2016 | Molettiere | H04L 67/22 |
| 2016/0316233 A1* | 10/2016 | Ghadi | H04N 21/242 |
| 2017/0034289 A1* | 2/2017 | Theobald | G06F 17/3087 |
| 2017/0034666 A1* | 2/2017 | Priness | H04W 4/04 |
| 2017/0064407 A1* | 3/2017 | Bonner | H04H 20/71 |
| 2017/0118533 A1* | 4/2017 | Holtz | G06Q 30/0269 |
| 2017/0177423 A1* | 6/2017 | Bradley | H04M 1/72569 |
| 2017/0255696 A1* | 9/2017 | Pulitzer | H04W 4/21 |
| 2017/0289168 A1* | 10/2017 | Bar | H04L 63/0853 |
| 2017/0345058 A1* | 11/2017 | Innes | G06Q 10/02 |
| 2018/0350144 A1* | 12/2018 | Rathod | H04W 4/029 |

OTHER PUBLICATIONS

Constine, J., "Gracenote's Ad Replacement System that Personalizes TV Commercials Will Start Trials in 2013", Dec. 26, 2012, http://techcrunch.com/2012/12/26/gracenote-tv-targeted-ads/, pp. 1-10.

* cited by examiner

SYSTEM AND METHOD FOR TARGETING MASS MEDIA ADS ON THE TELEVISION TO GIVEN PHYSICAL LOCATIONS USING ONLINE ACTIVITY PROFILES AT THE LOCATIONS

BACKGROUND

The present disclosure generally relates to targeted advertising, and more particularly relates to a system and method for targeting mass media advertisements on television to given physical locations using online activity profiles at those locations.

Personalized television advertisements ("ads") may currently be delivered at a location to an individual or a group of individuals. In addition, personalized ads may be delivered to individuals on televisions based upon what those individuals say online social network/media, both by building offline profiles as well as by analyzing in-session message streams. In general, television ads are delivered based upon mass settings, group profiles or individual profiles, while taking inputs from the social network/media in the latter cases.

BRIEF SUMMARY

In one embodiment, a computer-implemented method for selecting advertisements for delivery to at least one mass media streaming device at a given location and time slot is disclosed. The method comprises obtaining content and corresponding time and physical location information being posted in an online portal from at least one electronic device, filtering the content based on time slot and physical location, determining a set of typical topics for a given physical location and time slot, selecting a subset of advertisements from a set of available advertisements based on the set of typical topics, and delivering the subset of advertisements to the at least one mass media streaming device.

In another embodiment, a back end advertising server for selecting advertisements for delivery to at least one mass media streaming device at a given location and time slot is disclosed. The back end advertising server comprises memory and a processor that is operably coupled to the memory. The processor is configured to obtain content and corresponding time and physical location information being posted in an online portal from at least one electronic device, filter the content based on time slot and physical location, determine a set of typical topics for a given physical location and time slot, and select a subset of advertisements from a set of available advertisements based on the set of typical topics. The back end advertising server further comprises a communication interface operably coupled to the memory and the processor and configured to deliver the subset of advertisements to the at least one mass media streaming device.

In yet another embodiment, a computer program product for selecting advertisements for delivery to at least one mass media streaming device at a given location and time slot is disclosed. The computer program product comprises a storage medium readable by a processing circuit and storing instructions for execution by the processing circuit for performing a method. The method comprises obtaining content and corresponding time and physical location information being posted in an online portal from at least one electronic device, filtering the content based on time slot and physical location, determining a set of typical topics for a given physical location and time slot, selecting a subset of advertisements from a set of available advertisements based on the set of typical topics, and delivering the subset of advertisements to the at least one mass media streaming device.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Embodiments of the present disclosure provide a system and associated methods to conduct a time-centric analysis of locations in order to analyze and understand the nature of content/interests that are usually discussed in that location at that "type of the time" (e.g., day, month, year, hour—different sizes of time slots) and content that is currently being discussed at that location. Additionally, advertisements based upon either the "type of the time" or the combination of the above are delivered to televisions at that location and at that type of time.

Operating Environment

Figure 1:
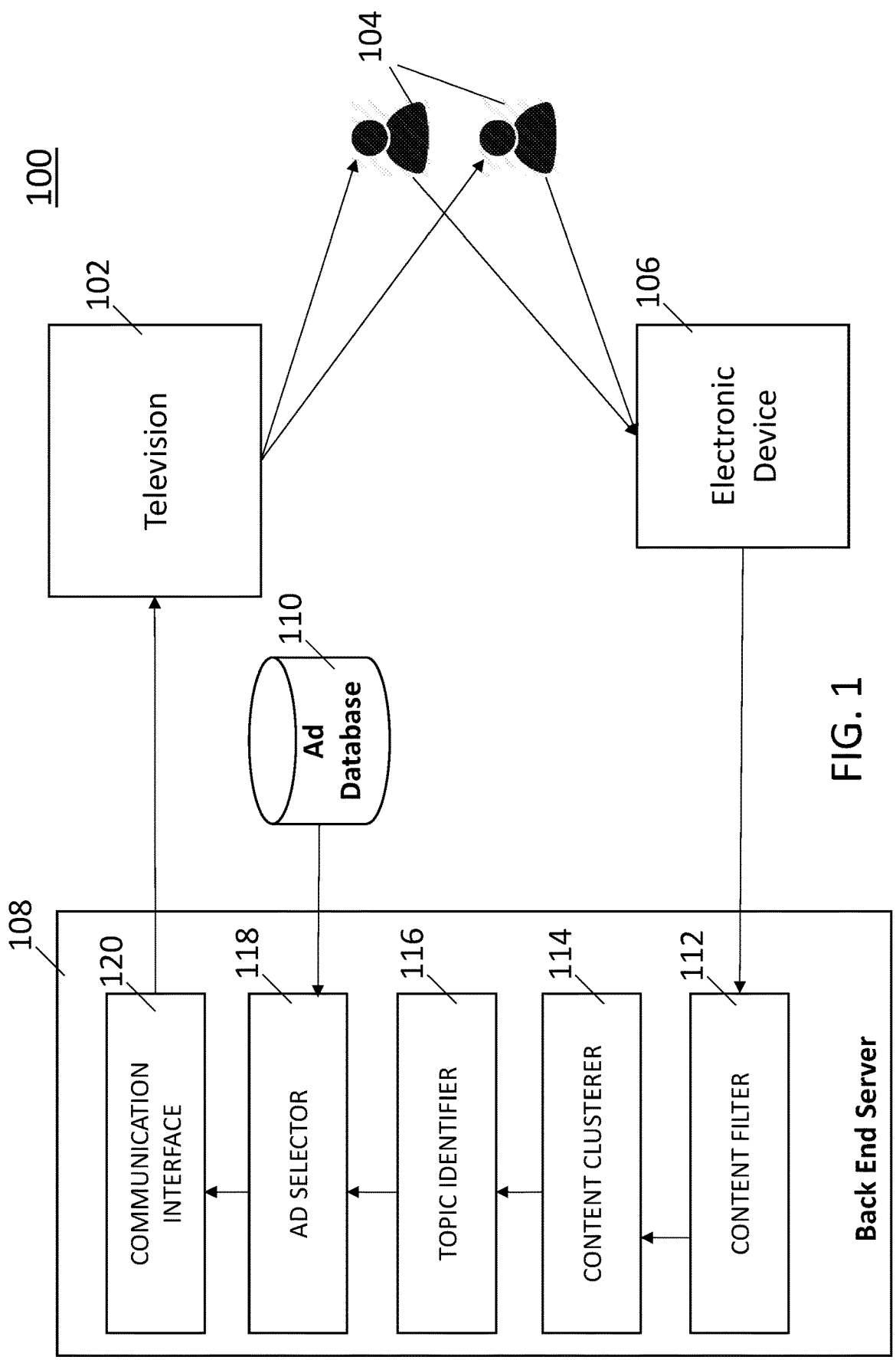
FIG. 1 is a block diagram illustrating one example of an operating environment comprising an advertisement delivery system according to one embodiment of the present disclosure.

FIG. 1 shows one example of an operating environment of advertisement delivery system 100 for providing personalized advertisements to televisions and/or other streaming mass media devices at a given physical location based upon time-slot centered learning/observation of activity trends as well as current activities, learned/observed on social network and/or media content generated by users during those time slots and at those physical locations.

The ads are targeted to certain physical locations (such as, all televisions in a specific brand of restaurants, all televisions within a shopping mall or an airport, etc.). The ads may be based upon a combination of learned/expected profile of activities (such as tweets, photo sharing online, theme of uploaded videos, etc.) typically occurring at that location during that time of the day/month/year (for example, "around noon," "between 11 AM to 12 noon," "during dinner time," "before Christmas," "first weekend of the month," etc.). In addition, the ads may be based upon the observed activity actually happening at the target locations at the time of the ad delivery.

The operating environment 100 comprises one or more televisions 102 (one shown) or other mass media streaming device (not shown), such as mobile phones, laptop computers, tablet computers, desktop computers, etc., which are viewed by one or more users 104 that are interacting with one or more online portals supporting user-generated content (such as FaceBook™, Twitter™, etc.) or other media publishing services via a plurality of electronic devices 106 (one shown and referenced generally herein as "electronic device 106"). The electronic device 106 may be, for example, a mobile phone, a laptop computer, a desktop computer, a tablet computer, or any other device that may access the Internet. The electronic device 106 is further in communication with a back end advertisement server 108 which includes a content filter 112, a content clusterer 114, a topic identifier 116, an advertisement selector 118 and a communication interface 120. The content filter 112 obtains and filters content information from each electronic device 106 which the electronic device 106 is posting to online portals. The content clusterer 114 sorts the filtered information into related groups or clusters. The topic identifier 116 identifies general topics of interest from the different clusters.

The ad selector 118 is in communication with an ad database 110, which may be external or internal to the back end advertising server 108 and contains a set of potentially available ads. The ad selector 118 selects a subset of ads from the available ads which match the theme of the topics being discussed at a given location during a given time slot.

The communication interface 120 delivers the selected subset of ads to the televisions or other mass media streaming devices at the given location.

Figure 2:
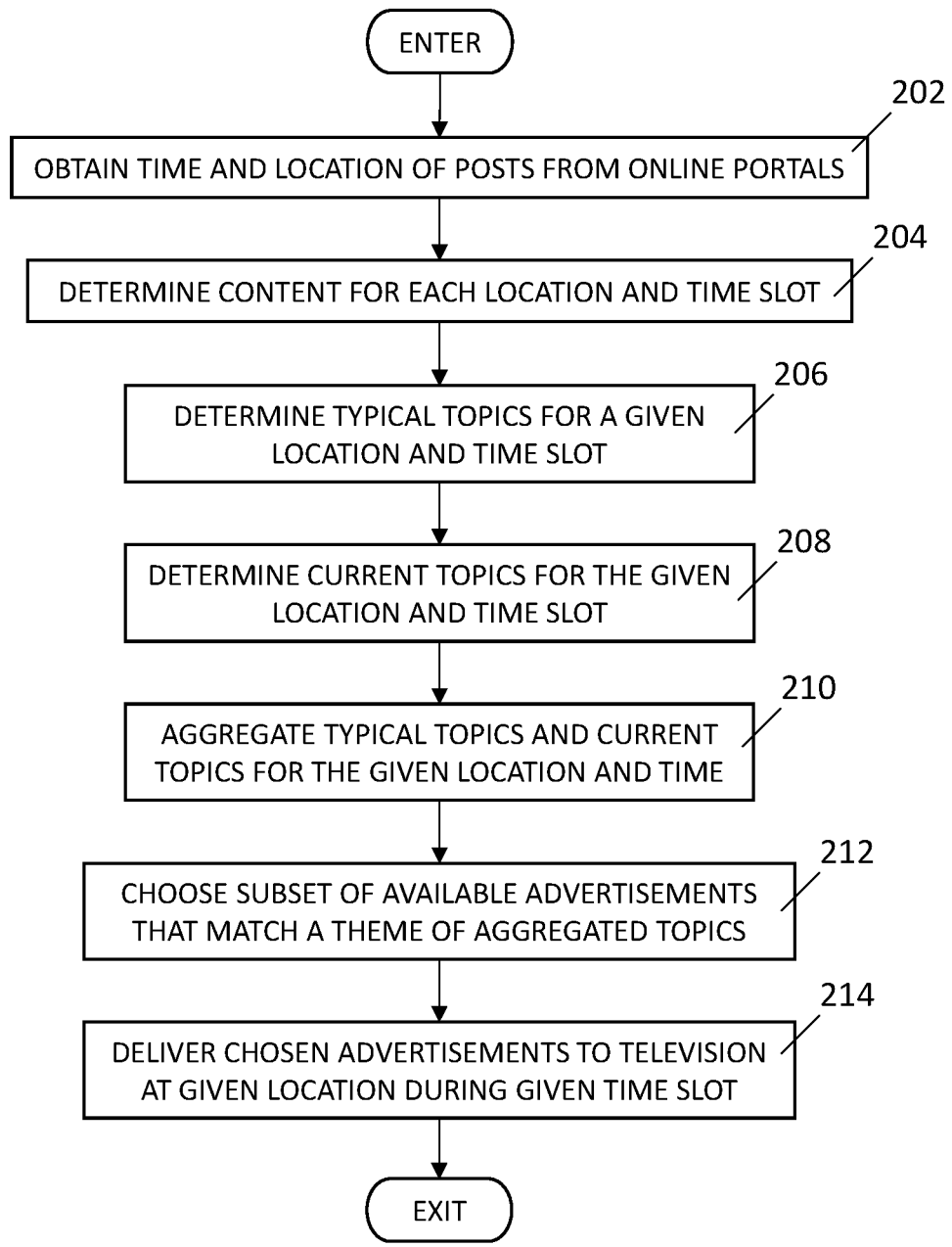
FIG. 2 is an operational flow diagram illustrating one process of determining and delivering advertising content to a television at a given location based on a time-centric analysis of online portal discussion occurring at the given location according to one embodiment of the present disclosure.

FIG. 2 is an operational flowchart 200 that identifies and delivers mass media content to televisions 102 and other devices at a given location and time slot based on time-centered activity and current discussion trends at the location according to one embodiment of the present disclosure.

Beginning at step 202, the back end advertising server 108 obtains the content and corresponding time and location of the posts made by people on online portals, such as online social networks, for each time slot and location of interest. The content is filtered, at step 204, according to location and time slot. For instance, the back end ad server 108 may obtain all posts, or information about all posts, made from the New York JFK Airport between 10:00 AM—11:00 AM on Tuesdays. There is no set duration of a time slot (e.g., one hour, one day, 15 minutes, etc.) and the physical size of a particular location may also vary.

For each location and each time slot, typical topics are determined, at step 206, to categorize what people are talking about. The determination may be performed using known techniques such as keyword extraction, and creating an associated corpus by also adding terms having a document co-occurrence above a predetermined policy threshold or based on learning, such as by Latent Dirichlet Allocation (LDA), Latent Semantic Indexing (LSI), etc. The content used for this determination may be collected over many time slots, for example, the back end ad server may determine that traffic conditions are a primary topic of interest at a particular location every weekday around 4:00-6:00 PM.

At step 208, currently trending topics at a given time and a given location may be optionally determined using similar techniques as in step 206.

If any current topic information is available (i.e. what is being currently discussed from that location), the set of current topics is aggregated with the set of typical topics at step 210. Otherwise, only the set of typical topics is used.

The ad selector 118 compares, at step 212, the aggregated set of topics with the set of available ads and chooses a subset that match the theme of these topics using known text and image/video frame clip matching techniques.

Advertisements from the selected subset are delivered, at step 214, to televisions and other electronic devices at the given locations during the given time slots. It should be noted that during the same time slots, televisions at other locations might not show the same subset of ads, but might show another subset of ads chosen for that location and that time slot in a similar manner.

Information Processing System

Figure 3:
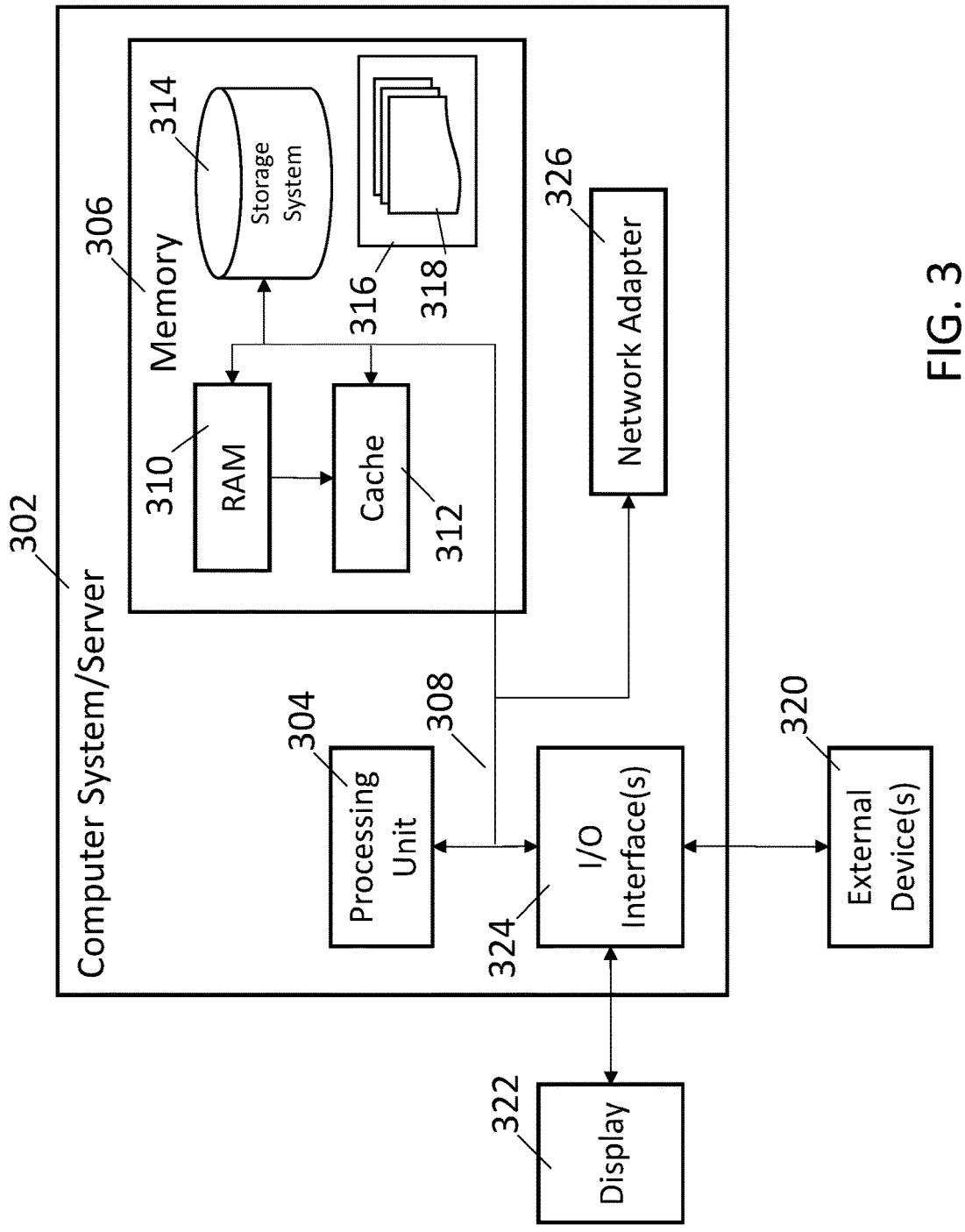
FIG. 3 is a block diagram of one example of a back end advertising server according to one embodiment of the present disclosure.

Referring now to FIG. 3, this figure is a block diagram illustrating an information processing system that can be utilized in embodiments of the present disclosure. The information processing system 302 is based upon a suitably configured processing system configured to implement one or more embodiments of the present disclosure (e.g., back end server 108). Any suitably configured processing system can be used as the information processing system 302 in embodiments of the present disclosure. The components of the information processing system 302 can include, but are not limited to, one or more processors or processing units 304, a system memory 306, and a bus 308 that couples various system components including the system memory 306 to the processor 304.

The bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 3, the main memory 306 may include cognitive engine content filter 112, content clusterer 114, topic identifier 116, and ad selector 118 shown in FIG. 1. One or more of these components can reside within the processor 304, or be a separate hardware component. The system memory 306 can also include computer system readable media in the form of volatile memory, such as random access memory (RAM) 310 and/or cache memory 312. The information processing system 302 can further include other removable/non-removable, volatile/non-volatile computer system storage media. By way of example only, a storage system 314 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 308 by one or more data media interfaces. The memory 306 can include at least one program product having a set of program modules that are configured to carry out the functions of an embodiment of the present disclosure.

Program/utility 316, having a set of program modules 318, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 318 generally carry out the functions and/or methodologies of embodiments of the present disclosure.

The information processing system 302 can also communicate with one or more external devices 320 such as a keyboard, a pointing device, a display 322, etc.; one or more devices that enable a user to interact with the information processing system 302; and/or any devices (e.g., network card, modem, etc.) that enable computer system/server 302 to communicate with one or more other computing devices. Such communication can occur via I/O interfaces 324. Still yet, the information processing system 302 can communicate with one or more networks such as a local area network (LAN), a general wide area network (WAN), and/or a public network (e.g., the Internet) via network adapter 326. As depicted, the network adapter 326 communicates with the other components of information processing system 302 via the bus 308. Other hardware and/or software components can also be used in conjunction with the information processing system 302. Examples include, but are not limited to: microcode, device drivers, redundant processing units, external disk drive arrays, RAID systems, tape drives, and data archival storage systems.

Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for selecting advertisements for delivery to at least one device at a given location and time slot, the method comprising:
   obtaining content and corresponding time and physical location information of a discussion currently being posted in an online portal from a plurality of electronic devices located at a physical location of a venue, the discussion occurring among users of the plurality of electronic devices and concerning observed activity happening at the physical location;
   filtering the content based on time slot and physical location, wherein the time slot is selected from a plurality of time slots having a plurality of durations;
   designating, from the filtered content, a set of one or more trending topics for a given physical location and time slot;
   determining a set of topics previously designated for the given physical location from prior filtered content;
   aggregating the set of topics previously designated for the given physical location with the set of one or more trending topics to create an aggregated set of topics;
   selecting a subset of advertisements from a set of available advertisements based on the aggregated set of topics;
   delivering the subset of advertisements to at least one mass media streaming device located at the physical location; and
   during the given timeslot, delivering a different subset of advertisements to at least one device at a different physical location.

2. The method of claim 1, wherein the at least one mass media streaming device is selected from a group consisting of a mass media streaming device and a television.

3. The method of claim 1, wherein advertisements are delivered to a plurality of devices located at the physical location.

4. The method of claim 1, wherein the set of typical topics for a given physical location and time slot is determined by:
   performing keyword extraction; and
   creating an associated corpus by adding terms having a document co-occurrence above a predetermined policy threshold or based on learning.

5. A back end advertising server for selecting advertisements for delivery to at least one device at a given location and time slot, the back end advertising server comprising:
   a memory;
   a processor operably coupled to the memory and configured to:
      obtain content and corresponding time and physical location information of a discussion currently being posted in an online portal from a plurality of electronic devices located at a physical location of a venue, the discussion occurring among users of the plurality of electronic devices and concerning observed activity happening at the physical location;
      filter the content based on time slot and physical location, wherein the time slot is selected from a plurality of time slots having a plurality of durations;
      designate, from the filtered content, a set of one or more trending topics for a given physical location and time slot; and
      determine a set of topics previously designated for the given physical location from prior filtered content;
      aggregate the set of topics previously designated for the given physical location with the set of one or more trending topics to create an aggregated set of topics;
      select a subset of advertisements from a set of available advertisements based on the aggregated set of topics; and
   a communication interface operably coupled to the memory and the processor and configured to:
      deliver the subset of advertisements to at least one mass media streaming device located at the physical location; and
      during the given timeslot, deliver a different subset of advertisements to at least one device at a different physical location.

6. The back end advertising server of claim 5, wherein the at least one device is selected from a group consisting of a mass media streaming device and a television.

7. The back end advertising server of claim 5, wherein advertisements are delivered to a plurality of devices located at the physical location.

8. The back end advertising server of claim 5, wherein the set of typical topics for a given physical location and time slot is determined by:
   performing keyword extraction; and creating an associated corpus by adding terms having a document co-occurrence above a predetermined policy threshold or based on learning.

9. A non-transitory computer readable storage medium for selecting advertisements for delivery to at least one device at a given location and time slot, the non-transitory computer readable storage medium comprising instructions for:
  obtaining content and corresponding time and physical location information of a discussion currently being posted in an online portal from a plurality of electronic devices located at a physical location of a venue, the discussion occurring among users of the plurality of electronic devices and concerning observed activity happening at the physical location;
  filtering the content based on time slot and physical location, wherein the time slot is selected from a plurality of time slots having a plurality of durations;
  designating, from the filtered content, a set of one or more trending topics for a given physical location and time slot;
  determining a set of topics previously designated for the given physical location from prior filtered content;
  aggregating the set of topics previously designated for the given physical location with the set of one or more trending topics to create an aggregated set of topics;
  selecting a subset of advertisements from a set of available advertisements based on the aggregated set of topics; and
  delivering the subset of advertisements to at least one mass media streaming device located at the physical location; and
  during the given timeslot, delivering a different subset of advertisements to at least one device at a different physical location.

10. The non-transitory computer readable storage medium of claim 9, wherein the at least one mass device is selected from a group consisting of a media streaming device and a television.

11. The non-transitory computer readable storage medium of claim 9, wherein advertisements are delivered to a plurality of devices located at the physical location.

12. The non-transitory computer readable storage medium of claim 9, wherein the method further comprises, during the given timeslot, delivering a different subset of advertisements to at least one device at a different physical location.

13. The method of claim 4, wherein the set of typical topics for a given physical location and time slot is collected over a plurality of time slots.

14. The back end advertising server of claim 8, wherein the set of typical topics for a given physical location and time slot is collected over a plurality of time slots.

15. The non-transitory computer readable storage medium of claim 9, wherein the set of typical topics for a given physical location and time slot is determined by:
  performing keyword extraction; and
  creating an associated corpus by adding terms having a document co-occurrence above a predetermined policy threshold or based on learning.

16. The non-transitory computer readable storage medium of claim 15, wherein the set of typical topics for a given physical location and time slot is collected over a plurality of time slots.

* * * * *